US012574843B2

(12) United States Patent
Nimbalker et al.

(10) Patent No.: US 12,574,843 B2
(45) Date of Patent: Mar. 10, 2026

(54) NR USER EQUIPMENT (UE) POWER SAVINGS REPORTING AND CONFIGURATION

(71) Applicant: Telefonaktiebolaget LM Ericsson (publ), Stockholm (SE)

(72) Inventors: Ajit Nimbalker, Fremont, CA (US); Ravikiran Nory, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/421,595

(22) PCT Filed: Dec. 19, 2019

(86) PCT No.: PCT/SE2019/051313
§ 371 (c)(1),
(2) Date: Jul. 8, 2021

(87) PCT Pub. No.: WO2020/145865
PCT Pub. Date: Jul. 16, 2020

(65) Prior Publication Data
US 2022/0167266 A1 May 26, 2022

Related U.S. Application Data

(60) Provisional application No. 62/790,737, filed on Jan. 10, 2019.

(51) Int. Cl.
H04W 52/02 (2009.01)
G06F 1/32 (2019.01)
(Continued)

(52) U.S. Cl.
CPC ....... H04W 52/0212 (2013.01); H04W 72/20 (2023.01)
(Continued)

(58) Field of Classification Search
CPC . H04L 1/1887; H04L 1/1854; H04L 41/0803; H04W 72/1263; H04W 28/0221;
(Continued)

(56) References Cited

U.S. PATENT DOCUMENTS

| 2015/0334653 A1* | 11/2015 | Ang | ................. | H04W 52/0212 |
| | | | | 370/311 |
| 2016/0192333 A1* | 6/2016 | Wang | .................... | H04L 5/0053 |
| | | | | 370/329 |

(Continued)

FOREIGN PATENT DOCUMENTS

WO  2020065624 A1  4/2020

OTHER PUBLICATIONS

"Considerations on triggering for UE power saving", 3GPP TSG RAN WG1 Meeting #95, R1-1812422, Spokane, USA, Nov. 12-16, 2018, pp. 1-7.

(Continued)

*Primary Examiner* — Marcus Smith
*Assistant Examiner* — Jason A Harley
(74) *Attorney, Agent, or Firm* — Murphy, Bilak & Homiller, PLLC

(57) ABSTRACT

Embodiments include methods, performed by a user equipment (UE), for reporting UE energy consumption information to a network node in a radio access network (RAN). Such methods include acquiring a set of candidate configurations related to UE operation in the RAN and determining UE energy consumption information related to the set. The UE energy consumption information can include respective energy consumption metrics associated with the candidate configurations, and/or a relative priority of the candidate configurations with regards to UE energy consumption reduction. Such methods also include reporting at least a portion of the UE energy consumption information to the
(Continued)

network node. Other embodiments include complementary methods, performed by a network node, that include selecting a particular candidate configuration, for the UE, based on the reported UE energy consumption information, and scheduling the UE for operation in the RAN according to the selected configuration.

20 Claims, 9 Drawing Sheets

(51) Int. Cl.

| | | |
|---|---|---|
| *H04W 24/10* | (2009.01) | |
| *H04W 68/02* | (2009.01) | |
| *H04W 72/1273* | (2023.01) | |
| *H04W 72/20* | (2023.01) | |
| *H04W 72/23* | (2023.01) | |

(58) Field of Classification Search
CPC ......... H04W 52/0245; H04W 52/0261; H04W 24/10; H04W 72/20; H04W 48/12
USPC .................................................. 370/329, 254
See application file for complete search history.

(56) References Cited

U.S. PATENT DOCUMENTS

| | | | | |
|---|---|---|---|---|
| 2017/0331577 A1* | 11/2017 | Parkvall | .................. | H04W 8/18 |
| 2017/0331670 A1* | 11/2017 | Parkvall | .............. | H04J 11/0056 |
| 2019/0149365 A1* | 5/2019 | Chatterjee | ............. | H04W 76/11 |
| | | | | 370/329 |
| 2019/0349891 A1* | 11/2019 | Rune | ..................... | H04L 5/0051 |
| 2019/0357185 A1* | 11/2019 | Kwak | ................... | H04L 1/0071 |
| 2021/0112585 A1* | 4/2021 | Ji | ........................... | H04W 72/23 |
| 2022/0078709 A1* | 3/2022 | Yang | ................ | H04W 52/0235 |
| 2022/0116881 A1* | 4/2022 | Shin | ...................... | H04W 52/14 |
| 2022/0312481 A1* | 9/2022 | Talarico | ................ | H04L 1/1812 |

OTHER PUBLICATIONS

"Power saving techniques", 3GPP TSG RAN WG I Meeting #95, RI-1812231, Spokane, USA, Nov. 12-16, 2018, pp. 1-7.
"Triggering Adaptation of UE Power Consumption Characteristics", 3GPP TSG RAN WG1 Meeting #95, R1-1812825, Spokane, USA, Nov. 12-16, 2018, pp. 1-4.
"UE Adaptation to the Traffic and UE Power Consumption Characteristics", 3GPP TSG-RAN WG1 Meeting #95, R1-1813447, Spokane, Washington, Nov. 12-16, 2018, pp. 1-11.
"3GPP TS 36.213 V15.3.0", 3rd Generation Partnership Project; Technical Specification Group Radio Access Network; Evolved Universal Terrestrial Radio Access (E-UTRA); Physical layer procedures (Release 15), Sep. 2018, pp. 1-546.
"3GPP TS 38.211 V15.3.0", 3rd Generation Partnership Project; Technical Specification Group Radio Access Network; NR; Physical channels and modulation (Release 15), Sep. 2018, pp. 1-96.

* cited by examiner

UE    E-UTRAN    EPC

Radio (Uu)    S1

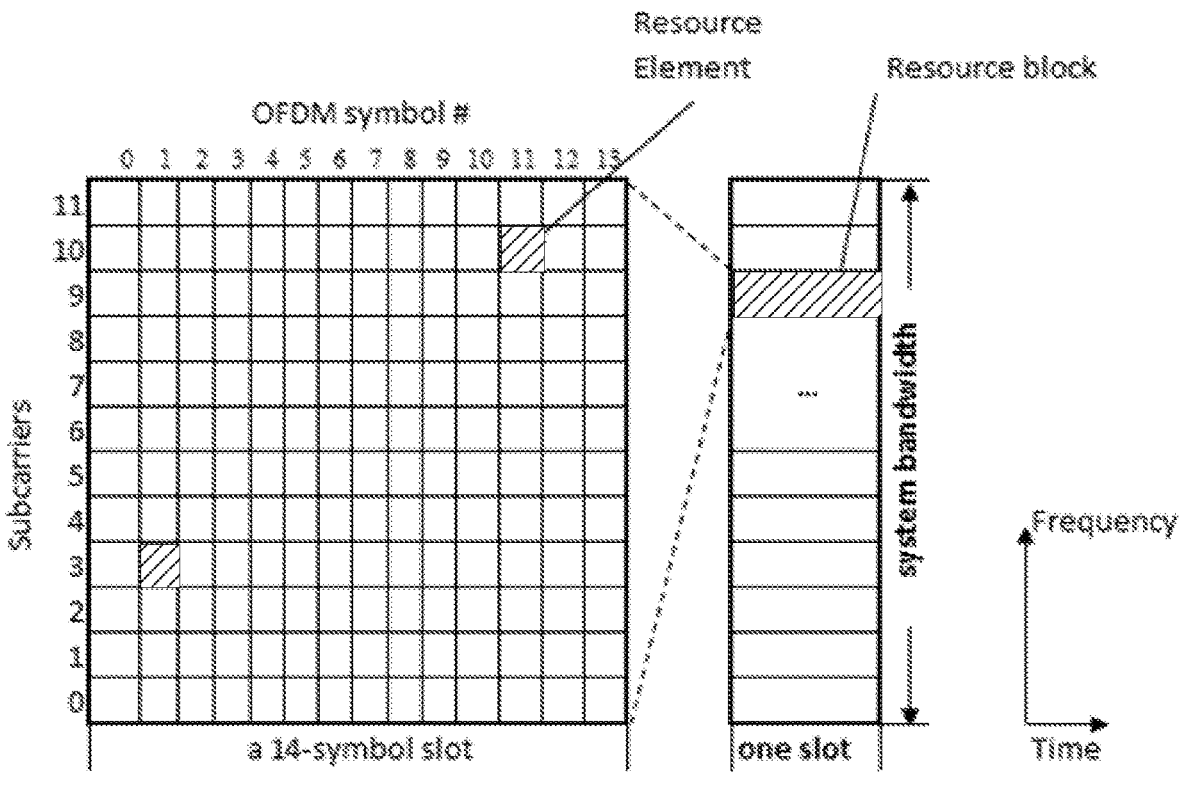
FIG. 5
FIG. 6A
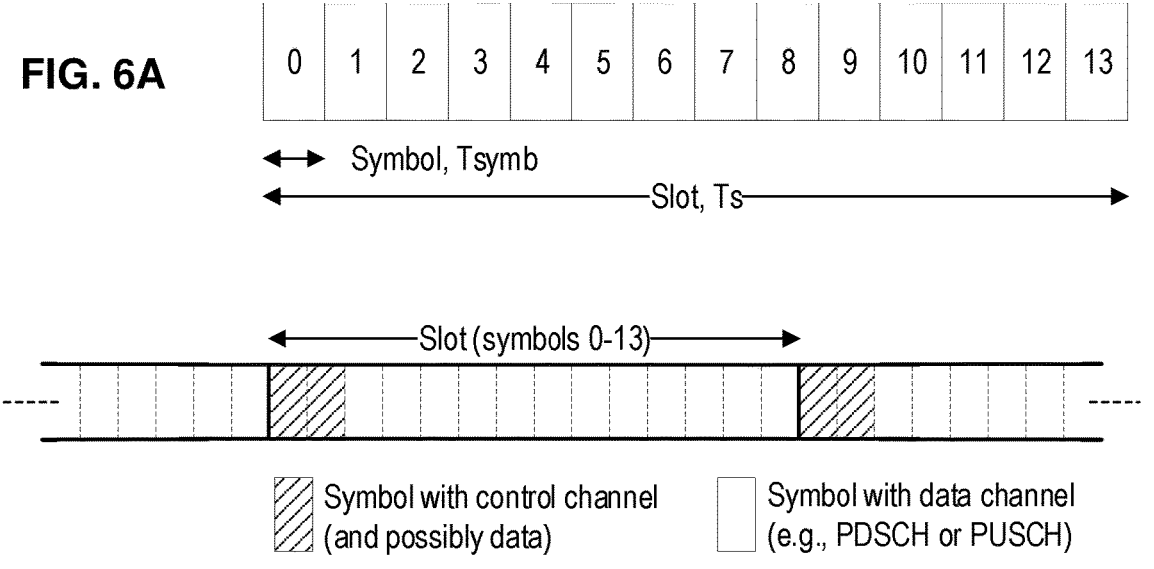
FIG. 6B

Receive an indication of UE-supported configurations.                905

Send the UE a set of candidate configurations.                910

Send the UE reporting requirements.                920

Receive, from the UE, UE energy consumption information related to the set, including at least one of the following :
respective energy consumption metrics associated with one or more of the candidate configurations; and
a relative priority of the candidate configurations with regards to UE energy consumption reduction.                930

Select a particular candidate configuration based on the UE energy consumption info.                940
Separate the set into first and second subsets based on a threshold.                941
Select, from either the first subset or the second subset, a candidate configuration that is preferred for network resource scheduling.                942

Schedule the UE, for operation in the RAN, according to the selected configuration.                950

FIG. 9

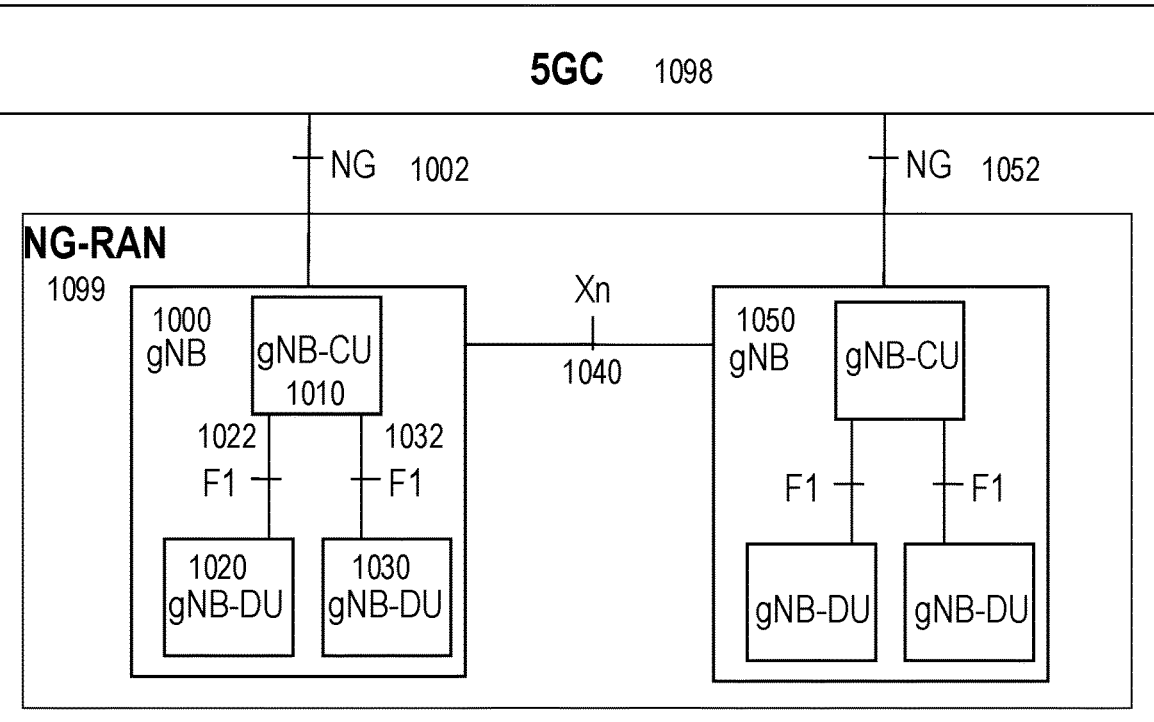

FIG. 10

NR USER EQUIPMENT (UE) POWER SAVINGS REPORTING AND CONFIGURATION

TECHNICAL FIELD

The present invention generally relates to wireless communication networks, and particularly relates to improvements to user equipment (UE) energy consumption when operating in such networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X1 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities— UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

The RRC layer controls communications between a UE and an eNB at the radio interface, as well as the mobility of a UE between cells in the E-UTRAN. In general, there are two primary RRC states for a UE. After the UE is powered ON it will be in the RRC_IDLE state until an RRC connection is established, at which time it will transition to RRC_CONNECTED state where data transfer can occur. After an RRC connection is released, the UE returns to RRC_IDLE. In RRC_IDLE state, the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE UL PHY includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, such as described in 3GPP TS 36.213. However, the term "PRB" shall be used in this disclosure to refer to both physical and virtual resource blocks. Moreover, the term "PRB" will be used herein to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries downlink control information (DCI) including scheduling assignments for PDSCH, grants for PUSCH and PUCCH, channel quality feedback (e.g., channel state information, CSI) for the UL channel, and other control information. DCI is typically transmitted in the first n OFDM symbols in each subframe, which is known as the control region. The number n(=1, 2, 3 or 4) is known as the Control Format Indicator (CFI) and is provided by the PCFICH transmitted in the first symbol of the control region.

Likewise, a PUCCH carries UL control information (UCI) such as scheduling requests (SR), CSI for the DL channel, HARQ feedback for PDSCH transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

FIG. 4 illustrates one exemplary manner in which the CCEs and REGs can be mapped to a physical resource, e.g., PRBs. As shown in FIG. 4, the REGs comprising the CCEs of the PDCCH can be mapped into the first three symbols of a subframe, whereas the remaining symbols are available for other physical channels, such as PDSCH or PUSCH that carry user data. In the exemplary arrangement shown in FIG. 4, each REG comprises four REs, which are represented by the small, dashed-line rectangles. Although two CCEs are shown in FIG. 4, the number of CCEs may vary depending on the required PDCCH capacity, which can be determined based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

In 3GPP, a study item on a new radio interface for 5G has recently been completed and 3GPP has now continued with the effort to standardize this new radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. Also similar to LTE, NR DL and UL physical resources are organized into equally-sized, time-domain subframes of 1 ms each, with each subframe further divided into multiple slots of equal duration, and with each slot including multiple OFDM-based symbols.

In both LTE and NR, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. Accordingly, techniques that can reduce unnecessary PDCCH monitoring, allow a UE to go to sleep more often, and/or allow a UE to wake up less frequently can be beneficial.

SUMMARY

Embodiments of the present disclosure provide specific improvements to communication between user equipment (UE) and network nodes in a wireless communication network, such as by facilitating solutions to overcome exemplary problems, issues, or drawbacks briefly mentioned above and described further below.

Some embodiments of the present disclosure include exemplary methods (e.g., procedures) for reporting user equipment (UE) energy consumption information to a network node in a radio access network (RAN). The exemplary methods can be performed by a user equipment (UE, e.g., wireless device, IoT device, modem, etc. or component thereof) in communication with the network node (e.g., base stations, eNBs, gNBs, etc., or components thereof) in the RAN (e.g., E-UTRAN, NG-RAN).

These exemplary methods can include acquiring a set of candidate configurations. For example, the UE can receive the set of candidate configurations from the network node, e.g., in an RRC message, downlink control information (DCI), MAC control element (CE), etc. In some embodiments, the network node can also provide a reference traffic type that is common to all candidate configurations of the set. Each candidate configuration of the set can include various settings and/or parameters associated with UE and/or network operation.

In some embodiments, these exemplary methods can also include indicating, to the network node, the configurations that the UE supports (i.e., UE-supported configurations). This can be done, for example, by sending one of the following to the network: a PHY message (e.g., UCI), a MAC message (e.g., buffer status report (BSR), power headroom report (PHR), control element (CE), etc.), an RRC message via PUSCH, etc. In such embodiments, the set of candidate configurations acquired can be a subset of the UE-supported configurations indicated to the network node.

These exemplary methods can also include determining UE energy consumption information related to the set of candidate configurations. The determined UE energy consumption information can include at least one of the following: respective energy consumption metrics associated with one or more of the candidate configurations, and a relative priority of the candidate configurations with regards to UE energy consumption.

Determining the UE energy consumption information can include analyzing the acquired set of candidate configurations based on information stored in the UE, which can be pre-configured (e.g., by the UE or chipset manufacturer), provided by the network (e.g., via RRC), etc. The UE can also base the determination and/or analysis on information relating to the UE's current operating conditions, capabilities, and/or limitations. The various information used in the determination and/or analysis can include any combination of data, tables, equations, relationships, thresholds, etc. that relate the parameter settings comprising the configurations to an estimate of UE energy consumption. In some embodiments, such operations can be augmented by cloud computing techniques whereby the UE can request information from a device management server (e.g., operated by device or OS vendor) to use in performing the operations, or could request such a server to actually perform the operations and return the determined metrics to the UE.

In some embodiments, the UE can determine a relative priority of the candidate configurations with regards to UE energy consumption. In some of these embodiments, the UE can determine the respective energy consumption metrics associated with the respective candidate configurations, then determine the relative priority based on the determined metrics. In other embodiments, however, the UE can determine the relative priority based on different metrics and/or computations, e.g., instead of or in addition to any energy consumption metrics determined. The determined relative priority of the configurations can be expressed in various ways.

These exemplary methods can also include reporting at least a portion of the UE energy consumption information to the network node. For example, the UE can report this information in a PHY message (e.g., UCI), MAC message (e.g., embedded in BSR, PHR, CE, etc.), RRC message via PUSCH, etc. The UE energy consumption can be reported in various formats and/or metrics, according to various embodiments. In some embodiments, these exemplary methods can also include receiving, from the network node, one or more reporting requirements related to the UE energy consumption information. The reporting format, frequency, etc. used by the UE can be based on these received reporting requirements.

Other embodiments of the present disclosure include exemplary methods (e.g., procedures) for scheduling a user equipment (UE) based on UE energy consumption information. These exemplary methods can be performed by a network node (e.g., base station, eNB, gNB, etc., or component thereof) of a radio access network (RAN, e.g., E-UTRAN, NG-RAN).

These exemplary methods can include sending the UE a set of candidate configurations. For example, the network node can send the set of candidate configurations to the UE, e.g., in an RRC message, DCI, MAC message, etc. In some embodiments, these exemplary methods can also include receiving, from the UE, an indication of UE-supported configurations. This can be done, for example, via any of the following: a PHY message (e.g., UCI), MAC message (e.g., buffer status report (BSR), power headroom report (PHR), control element (CE), etc.), RRC message via PUSCH, etc. In such embodiments, the set of candidate configurations sent to the UE can be a subset of the supported configurations received from the UE.

These exemplary methods can also include receiving, from the UE, UE energy consumption information related to the set of candidate configurations. The UE energy consumption information can include respective energy consumption metrics associated with one or more of the candidate configurations, and/or a relative priority of the candidate configurations with regards to UE energy consumption. The UE energy consumption can be received in various formats and/or metrics, according to various embodiments. In some embodiments, these exemplary methods can also include sending, to the UE, one or more reporting requirements related to the UE energy consumption information. The reporting format, frequency, etc. used by the UE can be based on these provided reporting requirements.

These exemplary methods can also include selecting a particular candidate configuration (i.e., from the set provided to the UE) based on the received UE energy consumption information. In some embodiments, selecting the particular candidate configuration can also be based on at least one of the following: UE energy consumption information received from other UEs, the network node's current resource scheduling status, and known or expected upcoming resource scheduling requirements (e.g., for the UE or for other UEs).

In some embodiments, if the UE reports energy consumption metrics associated with respective configurations, the network node can select a particular one of the configurations whose associated metric meets one or more criteria. In some of these embodiments, the network node can select the configuration whose associated energy consumption metric is best among the energy consumption metrics received from the UE. In other embodiments, if the report includes relative priorities of the candidate configurations, the network node can select the candidate configuration whose relative priority is highest.

In other embodiments, the network node can separate the set of candidate configurations into first and second subsets based on a threshold (e.g., an energy consumption reduction threshold or a relative priority threshold). The network node can then select, from either the first or second subset, a candidate configuration that is preferred for network resource scheduling. For example, the network node can select a candidate configuration whose energy consumption metric is better than a threshold of acceptability (i.e., "acceptable"), but is preferred among those configurations with acceptable metrics from the perspective of network resource scheduling.

These exemplary methods can also include scheduling the UE according to the selected configuration.

Other embodiments include user equipment (UEs, e.g., wireless devices, IoT devices, etc. or components thereof) and network nodes (e.g., base stations, eNBs, gNBs, CUs/DUs, controllers, etc. or components thereof) configured to perform operations corresponding to any of the exemplary methods described herein. Other embodiments include non-transitory, computer-readable media storing program instructions that, when executed by processing circuitry, configure such UEs of network nodes to perform operations corresponding to any of the exemplary methods described herein.

These and other objects, features, and advantages of the embodiments of the present disclosure will become apparent upon reading the following Detailed Description in view of the Drawings briefly described below.

BRIEF DESCRIPTION OF THE DRAWINGS

FIG. 5 shows an exemplary time-frequency resource grid for an NR slot.

FIGS. 6A-6B shows various exemplary NR slot configurations.

FIG. 9 shows a flow diagram of an exemplary method (e.g., procedure) performed by a network node (e.g., base station, gNB, eNB, etc. or component thereof) in a radio access network (RAN), according to various exemplary embodiments of the present disclosure.

FIG. 10 illustrates a high-level view of a 5G network architecture.

DETAILED DESCRIPTION

Figure 1:
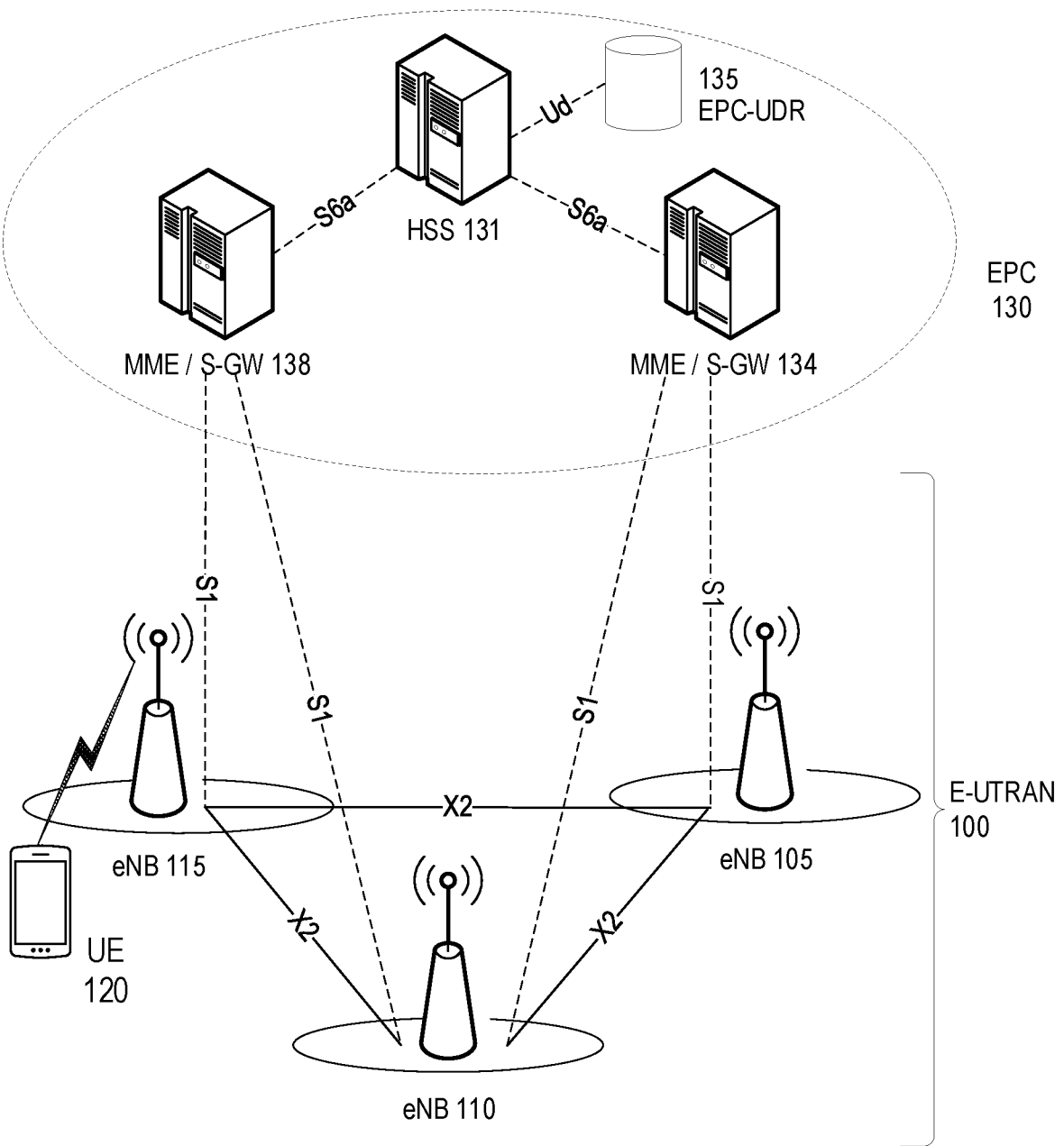
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
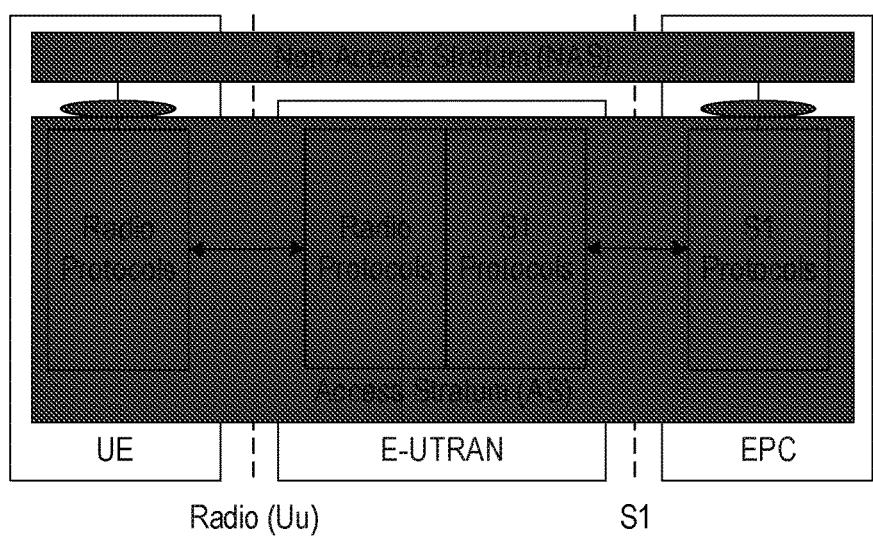
FIG. 2A is a high-level block diagram of an exemplary E-UTRAN architecture in terms of its constituent components, protocols, and interfaces.
Figure 2B:
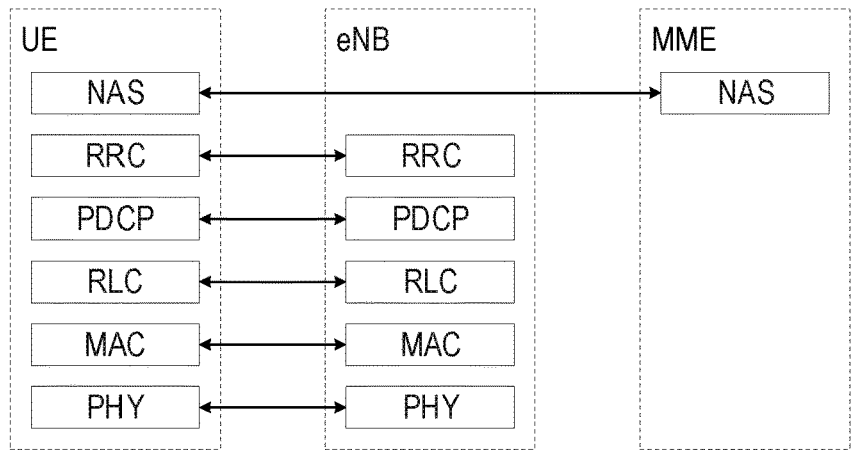
FIG. 2B is a block diagram of exemplary protocol layers of the control-plane portion of the radio (Uu) interface between a user equipment (UE) and the E-UTRAN.
Figure 2C:
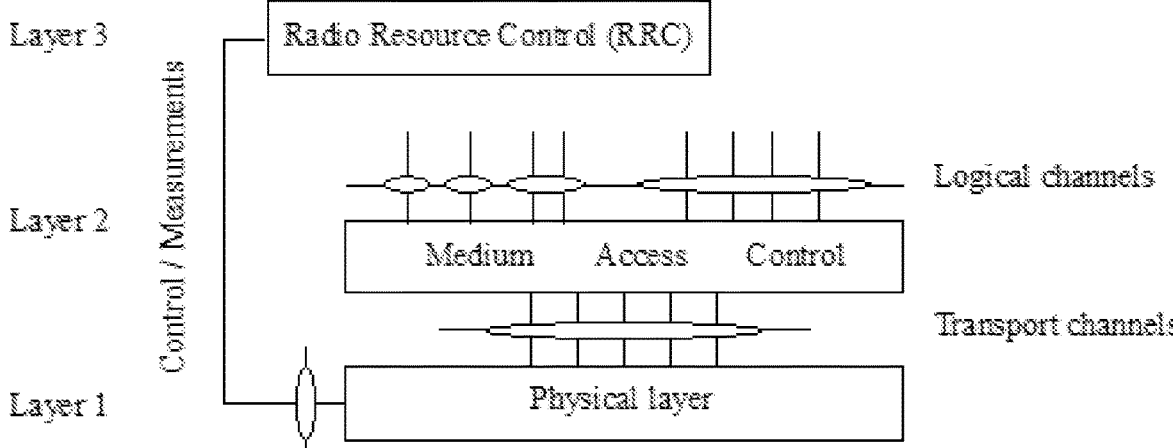
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell"

is used herein, it should be understood that (particularly with respect to 5G NR) beams may be used instead of cells and, as such, concepts described herein apply equally to both cells and beams.

As briefly mentioned above, in both LTE and NR, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, a UE may spend a substantial part of its energy on decoding PDCCH without detecting a DL scheduling assignment or UL resource grant in both LTE and NR. These issues, drawbacks, and/or problems are discussed in more detail below, along with various novel techniques that can reduce unnecessary PDCCH monitoring, allow UE to go to sleep more often, and/or allow the UE to wake up less frequently can be beneficial.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

In Rel-15 NR, a UE can be configured with up to four carrier bandwidth parts (BWPs) in the DL with a single DL carrier BWP being active at a given time. A UE can also be configured with up to four UL carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP,i}^{size}-1$, where i is the index of the particular BWP for the carrier. Similar to LTE, each NR resource element (RE) corresponds to one OFDM subcarrier during one OFDM symbol interval. Various SCS values (referred to as numerologies) are supported in NR and are given by $\Delta f=(15 \times 2^{\alpha})$ kHz where $\alpha \in (0, 1, 2, 3, 4)$. $\Delta f=15$ kHz is the basic (or reference) subcarrier spacing that is also used in LTE. The slot length is inversely related to subcarrier spacing or numerology according to $\frac{1}{2^{\alpha}}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^{\alpha}*180$ kHz.

Table 1 below summarizes the supported NR transmission numerologies and associated parameters. Different DL and UL numerologies can be configured by the network.

TABLE 1

| μ | $\Delta f = 2^{\mu} \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

An NR slot can include 14 symbols for normal cyclic prefix or 12 symbols for extended cyclic prefix. FIG. 6A shows an exemplary NR slot configuration comprising 14 OFDM symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Similar to LTE, NR data scheduling is done on a per-slot basis. In each slot, the base station (e.g., gNB) transmits downlink control information (DCI) over PDCCH that indicates which UE is scheduled to receive data in that slot, which RBs will carry that data. A UE first detects and decodes DCI and, if successful, then decodes the corresponding PDSCH based on the decoded DCI. Likewise, DCI can include UL grants that indicate which UE is scheduled to transmit data in that slot, which RBs will carry that data. a UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple terminals, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

The DCI payload together with the identifier-scrambled CRC is encoded and transmitted on the PDCCH. Given previously configured search spaces, each UE tries to detect a PDCCH addressed to it according to multiple hypothesis (also referred to as "candidates") with respect to payload size, aggregation level (AL), time-frequency (TF) grid location, etc. This process can be referred to as "blind decoding." Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) contained in the DCI.

Furthermore, in the context of NR, various channels are utilized for cell search and initial access, including SS/PBCH block (SSB for short), PDSCH carrying RMSI/RAR/MSG4 scheduled by PDCCH channels carrying DCI, PRACH channels and PUSCH channel carrying MSG3. SSB further comprises a primary synchronization signal (PSS), secondary synchronization signal (SSS), PBCH, and demodulation reference signals (DM-RS) associated with PBCH. SSB may have 15, 30, 120, or 240 kHz SCS depending on the frequency range.

FIG. 6B shows an exemplary NR slot structure with 15-kHz subcarrier spacing. Within an NR slot, the PDCCH channels are confined to a particular number of symbols and a particular number of subcarriers, where this region is referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Figure 4:
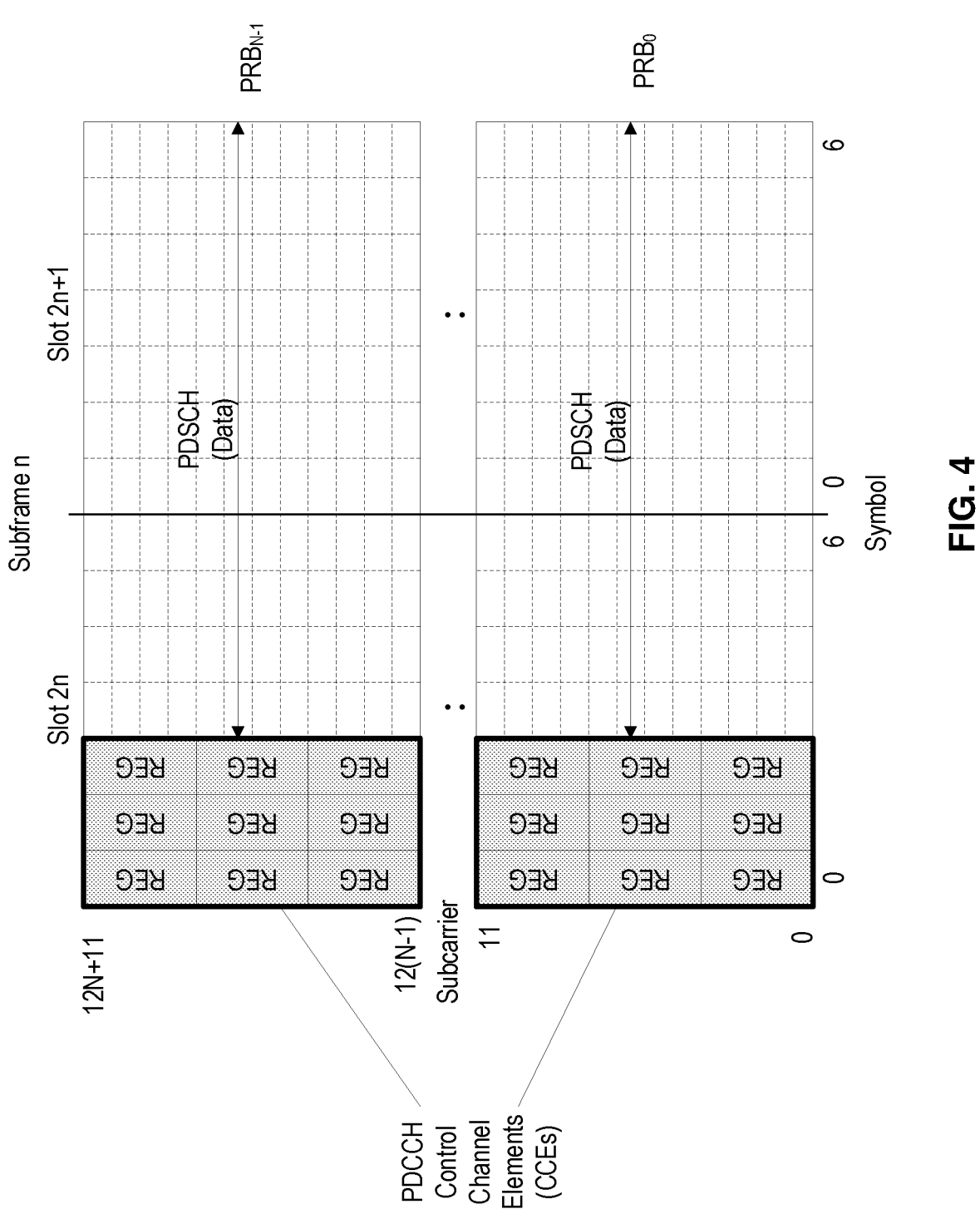
FIG. 4 shows an exemplary manner in which the CCEs and REGs can be mapped to a physical resource for LTE.

A CORESET is made up of multiple RBs (i.e., multiples of 12 REs) in the frequency domain and either one, two, or three OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in an RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is a Resource Element Group (REG), which spans one PRB in frequency and one OFDM symbol in time. Each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3, or 6 REGs.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

A hashing function can be used to determine the CCEs corresponding to PDCCH candidates that a UE must monitor within a search space set. The hashing is done differently for different UEs so that the CCEs used by the UEs are randomized and the probability of collisions between multiple UEs for which PDCCH messages are included in a CORESET is reduced.

A PDCCH candidate may span 1, 2, 4, 8, or 16 CCEs. If more than one CCE is used, the information in the first CCE is repeated in the other CCEs. Therefore, the number of aggregated CCEs used is referred to as the aggregation level (AL) for the PDCCH candidate. By varying the aggregation level, PDCCH can be made more or less robust for a certain payload size. In other words, PDCCH link adaptation can be performed by adjusting the aggregation level.

A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Figures 7, 8:
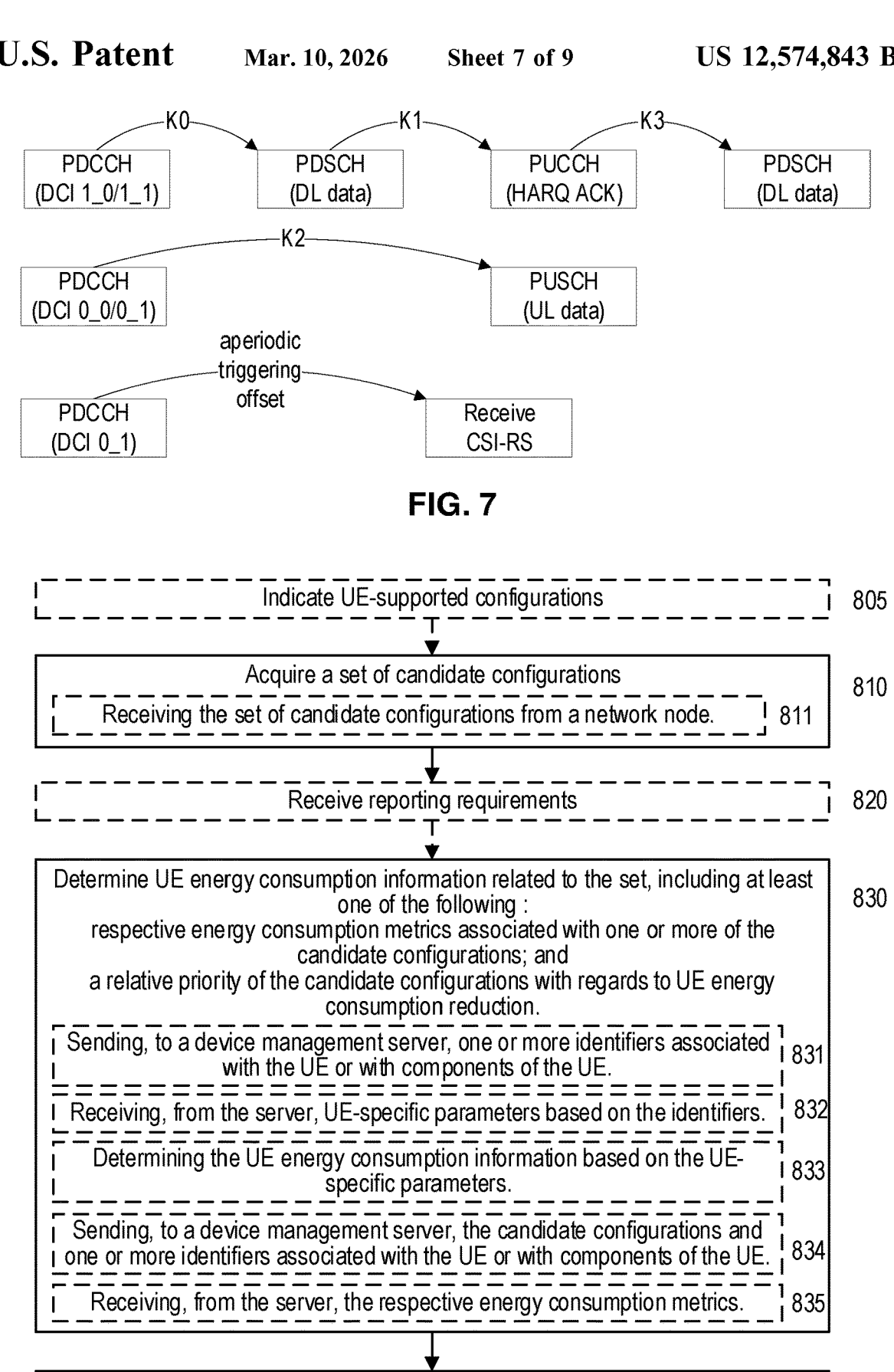
FIG. 7 illustrates various timing offsets between PDCCH, PDSCH, PUSCH, HARQ, and CSI-RS for NR.
FIG. 8 shows a flow diagram of an exemplary method (e.g., procedure) performed by a user equipment (UE, e.g., wireless device, MTC device, NB-IoT device, modem, etc. or component thereof), according to various exemplary embodiments of the present disclosure.

In addition, PDCCH can carry information about various timing offsets (e.g., in slots or subframes) between PDCCH and PDSCH, PUSCH, or PUCCH (e.g., HARQ and/or CSI-RS). FIG. 7 illustrates various timing offsets between PDCCH, PDSCH, PUSCH, HARQ, and CSI-RS for NR. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Offset K0 is part of a UE's PDSCH time-domain allocation (TDRA) provided by the network node. Also included in the PDSCH TDRA is a slot length indicator values (SLIV), which identifies a particular combination of a starting symbol (S) and a length (L) of the time-domain allocation for PDSCH. In general, S can be any symbol 0-13 and L can be any number of symbols beginning with S until the end of the slot (i.e., symbol 13). The SLIV can be used as a look-up table index to find the associated (S, L) combination. Similarly, offset K2 is part of a UE's PUSCH TDRA provided by the network node, which also includes a corresponding SLIV.

In RRC_CONNECTED mode, a UE monitors PDCCH for DL scheduling assignments (e.g., for PDSCH), UL resource grants (e.g., for PUSCH), and for other purposes. In LTE, depending on discontinuous reception (DRX) configuration, a UE may spend a substantial part of its energy on decoding PDCCH without detecting a DL scheduling assignment or UL resource grant. The situation can be similar in NR if similar DRX settings with traffic modelling are utilized, since the UE will still need to perform blind detection in its CORESETs to identify whether there is a PDCCH targeted to it.

Accordingly, techniques that can reduce unnecessary PDCCH monitoring, allow UE to go to sleep more often, and/or allow the UE to wake up less frequently can be beneficial. One such technique is UE assistance information for preferred power-saving configurations, whereby the UE can provide the network one or more preferred power-saving configuration values, such as preferred time-domain resource allocations, preferred BWP configuration (e.g., location, span), etc.

From the network (e.g., gNB) perspective, such assistance information can be helpful but can also become overly complicated if different UEs report different preferences that conflict and/or become too complex to manage in the scheduler. In such case, a gNB may start ignoring the UE's assistance information. This is problematic from two different perspectives. From the network's perspective, UL resources were wasted in providing the ignored assistance information. From the UE's perspective, the desired energy consumption reductions will not be attainable without the network's assistance. As such, there is a need for improved techniques and/or mechanisms for identifying preferred configurations of individual UEs and/or applying such configurations when scheduling multiple UEs.

Exemplary embodiments of the present disclosure address these and other problems, issues, and/or drawbacks by providing techniques for a network (e.g., serving gNB) to offer a UE a set of possible (also referred to as "candidate") configurations and to request a UE preference among the set based on UE energy reduction goals, metrics, criteria, etc. This preference can be provided in a report and/or message from the UE. To facilitate final scheduling decisions for all served UEs, the network could offer each UE a streamlined set of (e.g., a subset of all possible) candidate configurations that avoid overly complex, unmanageable, and/or conflicting UE scheduling. Likewise, the subset can omit possible features and/or configurations that are not implemented by the UE. These non-implemented features can be determined based on known (e.g., previously-reported) UE capabilities. The UE can then select one or more preferred configurations from this subset according to its energy-reduction criteria and report the selection(s) to the network.

Exemplary embodiments provide various benefits, advantages, and/or specific improvements. For example, embodiments allow the network to receive UE assistance in a more controlled manner (e.g., by tailored request). As another example, embodiments facilitate network scheduling decisions while taking into account UE preferences for energy reduction. As another example, embodiments allow UEs to reduce energy consumption while still receiving network-scheduled resources needed for UE transmission and/or reception.

According to various exemplary embodiments, when determining the set of candidate configurations from which the UE can choose, the network can consider various UE features, capabilities, and/or parameters together with various network features capabilities, and/or parameters. For example, the network can select candidate configurations that adapt the UE performance in the following domains and/or dimensions:

time domain, which can include adapting PDCCH monitoring, enhanced cross-slot scheduling (e.g., K0), etc.;

frequency domain, which can include BWP enhancements including switching between narrow and wide BWPs, enhanced secondary cell (SCell) operation, activation/deactivation enhancements, etc.;

antenna or spatial domain, which can include operating with reduced number of layers on control, data channels processing time, which can include relaxed feedback timing (e.g., K1, K2), etc.;

discontinuous reception (DRX), including active/on time and cycle;

PDCCH monitoring complexity, including bandwidth, aggregation level (AL), blind decoding (BD), CCEs, etc.;

wake-up signaling (WUS), including from deep sleep, light sleep, or micro-sleep;

go-to-sleep (GTS) signaling, including into deep sleep, light sleep, or micro-sleep.

UE energy consumption reduction by performance adaptation in a particular domain and/or dimension, including those listed above, can be estimated by the network based on standardized (e.g., by 3GPP) or vendor-proprietary UE energy consumption models. Even so, the actual UE energy consumption reduction for a particular performance adaptation will generally depend on the specific UE implementation (including specific chipsets in the UE), and such information is generally confidential and not publicly available. Relative to a general predictive model, the actual gains can vary widely because UE-specific power management schemes can include detailed and/or optimized control of hardware and software modules, including mechanism in which different components or modules are shut off and/or adaptively controlled. For example, different voltage and/or clock frequency settings can be applied for different UE operations.

Nevertheless, it can be beneficial for the network to know the approximate energy reduction of a particular adaptation (e.g., in one or more domains and/or dimensions) by a particular UE when evaluating the impact of any scheduling and/or resource restrictions based on that particular adaptation. Some estimates could be derived based on standardized models, but it would be desirable if better estimates of the costs and benefits of various UE adaptations can be obtained through cooperation between the network, UE, and/or chipset vendors.

As another alternative, the UE can provide the network with an estimated energy reduction associated with one or more particular adaptations (also referred to as "candidate configurations") considered by the network. This can be provided upon request by the network, which can identify the candidate configurations as part of the request. The estimated energy reduction can be provided in the form of one or more metrics, according to various ranges, resolutions, granularities, etc. For example, to balance the goals of energy savings and network scheduling against non-disclosure of vendor-proprietary performance data, the UE can provide the estimated energy reduction at a relatively coarse resolution. Even such a coarse metric could benefit the network in determining cost/benefit tradeoffs for certain candidate configurations (e.g., a change from 20 MHz BWP to 10 MHz BWP, or vice versa). For other candidate configurations, however, the network could benefit from the UE providing the estimated energy reduction with a higher resolution and/or lower granularity.

Accordingly, in some embodiments, the network provides the UE a set of one or more candidate configurations and/or adaptations and requests the UE to provide energy consumption reduction information (e.g., metrics) related to the set. Alternately, the network can request the UE to provide one or more preferred configurations from the set. The UE then analyzes the provided set (e.g., with an assistance computation unit/function/module) and determines information that can include energy consumption reduction metrics associated with at least some of the candidate configurations, as well as one or more preferred candidate configurations of the set. The UE can then report such information to the network node, which can use the reported information to select, determine, and/or adjust its scheduling configuration for this particular UE.

Various embodiments of the present disclosure can be illustrated by FIG. 8, which shows a flow diagram of an exemplary method (e.g., procedure) for reporting user equipment (UE) energy consumption information to a network node in a radio access network (RAN). This exemplary method can be performed by a user equipment (UE, e.g., wireless device, IoT device, etc. or component thereof) in communication with a network node (e.g., base station, eNB, gNB, etc., or component thereof) in the RAN (e.g., E-UTRAN, NG-RAN). For example, the exemplary method shown in FIG. 8 can be implemented in a UE configured as described in relation to other figures herein. Furthermore, the exemplary method shown in FIG. 8 can be used cooperatively with other exemplary methods described herein (e.g., FIG. 9) to provide various benefits and/or advantages, including those described herein. Although FIG. 8 shows specific blocks in a particular order, the operations of the blocks can be performed in a different order than shown and can be combined and/or divided into blocks having different functionality than shown. Optional blocks or operations are indicated by dashed lines.

The exemplary method can include the operations of block 810, where the UE can acquire a set of candidate configurations. For example, the UE can receive the set of candidate configurations from the network node, e.g., in an RRC message, downlink control information (DCI), MAC control element (CE), etc. In some embodiments, the network can also provide a reference traffic type that is common to all candidate configurations of the set. Each candidate configuration of the set can include various settings and/or parameters associated with UE and/or network operation. For example, each candidate configuration can include one or more of the following:

- PDCCH configuration including CORESET, monitoring periodicity, bandwidth, aggregation level (AL), blind decoding (BD), CCEs, etc.;
- PDSCH configuration (e.g., TDRA) or range/group of PDSCH configurations, including minimum K0 slot offset value (or K0 range) and SLIV (or group of SLIVs);
- PUSCH configuration (e.g., TDRA) or range/group of PUSCH configurations, including minimum K2 slot offset value (or K2 range) and SLIV (or group of SLIVs);
- HARQ configuration (e.g., K1 value or range);
- Minimum required processing times between UE operations, such as:
  - Minimum processing times for PDSCH HARQ feedback generation (e.g., from end of corresponding PDSCH);
  - Minimum processing times for PUSCH preparation (e.g., from end of corresponding PDCCH);
  - Minimum processing times for PDSCH reception (e.g., from end of corresponding PDCCH);
  - HARQ processing time value (e.g., minimum K1 or set of K1s);
- One or more DRX configurations (e.g., On duration, DRX cycle time, support for deep/light/micro sleep);

- Antenna or spatial configuration (e.g. maximum number of DL and/or UL layers);
- Frequency-domain configuration(s) (e.g., BWP, sub-carrier spacing, numerology, number of SCells, component carrier activation/deactivation, etc.)

To illustrate these embodiments with a more specific example, the UE can receive the following set of possible scheduling configurations from the network:

A. Configuration A:
1. PDCCH configuration: CORESET span=2 symbols, monitoring periodicity=14 symbols.
2. PDSCH configurations:
   a. TDRAs corresponding to K0=0 and SLIV=(S, 2), where S can be any appropriate value.
   b. TDRAs corresponding to K0>1 and SLIV=(S, L), where $2 \leq L \leq 14$ and S can be any appropriate value.

B. Configuration B:
1. PDCCH configuration: CORESET span=1 symbol, monitoring periodicity=14 symbols.
2. PDSCH configuration: TDRAs corresponding to K0>1 and SLIV=(S, L), where $2 \leq L \leq 14$ and S can be any appropriate value.

C. Configuration C:
1. PDCCH configuration: CORESET span=3 symbols, monitoring periodicity=14 symbols.
2. PDSCH configurations:
   a. TDRAs corresponding to K0=1 and SLIV=(S, 4), where S can be any appropriate value.
   b. TDRAs corresponding to K0>1 and SLIV=(S, L), where $2 \leq L \leq 14$ and S can be any appropriate value.

In some embodiments, the exemplary method can include the operations of block 805, where the UE can indicate, to the network, the configurations that it supports (i.e., UE-supported configurations). This can be done, for example, by sending one of the following to the network: a PHY message (e.g., UCI), a MAC message (e.g., buffer status report (BSR), power headroom report (PHR), control element (CE), etc.), an RRC message via PUSCH, etc. In such embodiments, the set of candidate configurations acquired in block 810 can be a subset of the UE-supported configurations indicated to the network node in block 805.

As an example, a discrete set of energy consumption reduction levels (e.g., levels 1, 2, etc.) can be defined. For example, level 1 could be a basic energy consumption reduction (e.g., layer-1 DRX control), level 2 could be a more advanced energy consumption reduction (e.g., PDCCH monitoring adaptations), etc. The UE can indicate (e.g., in block 805) which levels it can support. In some embodiments, the UE can indicate supported energy reduction level separately for each parameter and/or setting comprising the respective configurations, such as for BWP, sub-carrier spacing, component carrier (CC), traffic type, DRX, PDCCH configuration, etc.

The exemplary method can also include the operations of block 830, where the UE can determine UE energy consumption information related to the set of candidate configurations. The determined UE energy consumption information can include at least one of the following: respective energy consumption metrics associated with one or more of the candidate configurations; and a relative priority of the candidate configurations with regards to UE energy consumption.

Determining the UE energy consumption information can include analyzing the acquired set of candidate configurations based on information stored in the UE, which can be pre-configured (e.g., by the UE or chipset manufacturer), provided by the network (e.g., via RRC), etc. The UE can also base the determination and/or analysis on information relating to the UE's current operating conditions, capabilities, and/or limitations. The various information used in the determination and/or analysis can include any combination of data, tables, equations, relationships, thresholds, etc. that relate the parameter settings comprising the configurations to an estimate of UE energy consumption. In some embodiments, the analysis can be performed by a particular module, unit, component, etc. of the UE, which is referred to herein as an "assistance computation unit."

Various metrics can be determined, including metrics directly representing energy consumption of a particular setting and/or configuration (e.g., Watts) as well as metrics indicating energy consumption relative to a threshold or a different setting and/or configuration (e.g., A consumes 40% less than B, but 10% more than C). The operations of block 830 can also be performed by the assistance computation unit, or by a different module, unit, component, etc.

In some embodiments, the UE can use artificial intelligence (AI), neural network, and/or other machine-learning algorithms in determining the respective energy consumption metrics associated with one or more of the candidate configurations (e.g., in block 830). In some embodiments, such operations can be augmented by cloud computing techniques whereby the UE can request information from a device management server (e.g., operated by device or OS vendor) to use in performing the operations, or could request such a server to actually perform the operations and return the determined metrics to the UE. For example, to facilitate this, the UE could provide the server various information including the set of candidate configurations, a device model number, device build number, chipset identifier, FCC identifier, etc.

Accordingly, in some embodiments, the operations of block 830 can include the operations of sub-blocks 831-833. In sub-block 831, the UE can send, to a device management server, one or more identifiers associated with the UE (e.g., IMEI) or with components of the UE (e.g., chipset model numbers, serial numbers, etc.). In sub-block 832, the UE can receive, from the device management server, one or more UE-specific parameters based on the identifiers. For example, the UE-specific parameters can be energy consumption parameters and/or models associated with the components of the UE. In sub-block 833, the UE can determine the UE energy consumption information related to the set based on the UE-specific parameters.

In other embodiments, the operations of block 830 can include the operations of sub-blocks 834-835. In sub-block 834, the UE can send, to a device management server, the set of candidate configurations and one or more identifiers associated with the UE (e.g., IMEI) or with components of the UE (e.g., chipset model numbers, serial numbers, etc.). In sub-block 835, the UE can receive, from the device management server, the respective energy consumption metrics.

In some embodiments, the UE can determine a relative priority of the candidate configurations with regards to UE energy consumption. In some of these embodiments, the UE can determine the respective energy consumption metrics associated with the respective candidate configurations, then determine the relative priority based on the determined metrics. In other embodiments, however, the UE can determine the relative priority based on different metrics and/or computations, e.g., instead of or in addition to any energy consumption metrics determined in block 830.

The determined relative priority of the configurations can be expressed in various ways. For example, the UE can determine a ranking from best to worst, e.g., A, B, C. As another example, the UE can determine that a one configuration is best without explicitly ranking the remaining configurations of the set. As another example, the UE can determine that one or more configurations are above a threshold level (e.g., of required energy consumption reduction) and the remaining configurations are below the threshold level. Various combinations are also possible (e.g., ranking best-to-worst for configurations above threshold). In some embodiments, The exemplary method and/or procedure can also include the operations of block 840, where the UE can report at least a portion of the UE energy consumption information (e.g., determined in block 830) to the network node. For example, the UE can report this information in a PHY message (e.g., UCI), MAC message (e.g., embedded in BSR, PHR, CE, etc.), RRC message via PUSCH, etc.

In some embodiments, the respective energy consumption metrics can be reported as a first metric or a first identifier associated with a first candidate configuration of the set (e.g., the candidate that a reference and/or is "best" in some manner) and differential metrics, for one or more other candidate configurations of the set, relative to the first candidate configuration. For example, for candidate configurations {A,B,C}, the first candidate configuration can be "A", which can reported as an identifier of "A" or a reference energy consumption reduction ("X") associated with "A." The other metrics can be reported as "B" is 30% worse than "A" and "C" is 40% worse than "A."

It can be beneficial to restrict the amount of the information the UE feeds back to the network node. For example, very frequent UE reports can lead to increased overhead and power consumption. In some embodiments, the network can configure the type and/or content of the report made by the UE, and/or reporting triggers such as traffic arrival, transmission of BSR, expiration of timer with configured value of X, acquisition of the set of candidate configurations, etc. For example, the network can configure the UE to transmit timer-triggered reports N times per X milliseconds, where N≥1. The network can configure the UE with these reporting requirements along with the set of candidate configurations, or in one or more separate messages.

Accordingly, in some embodiments, the exemplary method can also include the operations of block 820, in which the UE can receive, from the network node, one or more reporting requirements related to the UE energy consumption information. Although illustrated as two separate operations in FIG. 8, the UE can also receive these reporting requirements together with set of candidate configurations in block 810.

Various embodiments of the present disclosure can also be illustrated by FIG. 9, which shows a flow diagram of an exemplary method (e.g., procedure) for scheduling a user equipment (UE) based on UE energy consumption information. This exemplary method can be performed by a network node (e.g., base station, eNB, gNB, etc., or component thereof) of a radio access network (RAN, e.g., E-UTRAN, NG-RAN). For example, the exemplary method shown in FIG. 9 can be implemented in a network node configured as described in relation to other figures herein. Furthermore, the exemplary method shown in FIG. 9 can be used cooperatively with other exemplary methods described herein (e.g., FIG. 8) to provide various benefits and/or advantages, including those described herein. Although FIG. 9 shows specific blocks in a particular order, the operations of the blocks can be performed in a different order than shown and can be combined and/or divided into blocks having different functionality than shown. Optional blocks or operations are indicated by dashed lines.

The exemplary method can include the operations of block 910, where the network node can send the UE a set of candidate configurations. For example, the network node can send the set of candidate configurations to the UE, e.g., in an RRC message, DCI, MAC message, etc. Each candidate configuration of the set can include various settings and/or parameters associated with UE and/or network operation, including any of those discussed above in relation to the UE operations of block 810.

In some embodiments, the exemplary method can also include the operations of block 905, where the network node can receive, from the UE, an indication of UE-supported configurations. In general, any embodiment of the indication sent by the UE in block 805 can be received by the network node in block 905. This can be done, for example, via any of the following: a PHY message (e.g., UCI), MAC message (e.g., buffer status report (BSR), power headroom report (PHR), control element (CE), etc.), RRC message via PUSCH, etc. In such embodiments, the set of candidate configurations sent in block 910 can be a subset of the supported configurations received from the UE in block 905.

As discussed above, it can be beneficial to restrict the amount of the information the UE feeds back to the NW. Accordingly, in some embodiments, the exemplary method and/or procedure can include the operations of block 920, where the network node can send, to the UE, one or more reporting requirements related to the UE energy consumption information. In general, any embodiment of the reporting requirements received by the UE in block 820 can be sent by the network node in block 920. Although illustrated as two separate operations in FIG. 9, the network can also send these reporting requirements together with set of candidate configurations in block 910.

The exemplary method can also include the operations of block 930, where the network node can receive, from the UE, UE energy consumption information related to the set (e.g., sent to the UE in block 910). The UE energy consumption information can include at least one of the following: respective energy consumption metrics associated with one or more of the candidate configurations; and a relative priority of the candidate configurations with regards to UE energy consumption. Exemplary energy consumption metrics received in block 930 can include any of those determined and reported by the UE in blocks 830-840, discussed above. Exemplary relative priorities received in block 930 can include any of those determined and reported by the UE in blocks 830-840, discussed above.

The exemplary method can also include the operations of block 940, where the network node can select a particular candidate configuration (e.g. from the set sent in block 910) based on the UE energy consumption information (e.g., received in block 930). In some embodiments, selecting the particular candidate configuration can also be based on at least one of the following: UE energy consumption information received from other UEs, the network node's current resource scheduling status, and known or expected upcoming resource scheduling requirements (e.g., for the UE or for other UEs).

In some embodiments, if the UE reports energy consumption metrics associated with respective configurations, the network node can select a particular one of the configurations whose associated metric meets one or more criteria. In some of these embodiments, the network node can select the configuration whose associated energy consumption metric is best (e.g., lowest or highest, according to the particular metric) among the energy consumption metrics received from the UE. In other embodiments, if the report includes relative priorities of the candidate configurations, the network node can select the candidate configuration whose relative priority is highest.

In other of these embodiments, the selecting operation in block 940 can include the operations of sub-blocks 941-942. In sub-block 941, the network node can separate the set of candidate configurations into first and second subsets based on a threshold (e.g., an energy consumption reduction threshold or a relative priority threshold). For example, all candidate configurations of the first subset can have an energy consumption metric or a relative priority that is better than the threshold, and all candidate configurations of the second subset have an energy consumption metric or a relative priority that is worse than the threshold. Here, the terms "better than" or "worse than" are used to denote more or less energy consumption reduction, respectively, as compared to an energy consumption reduction associated with the threshold. In sub-block 942, the network node can select, from either the first or second subset, a candidate configuration that is preferred for network resource scheduling.

For example, the network node can select a candidate configuration whose energy consumption metric is better than a threshold of acceptability (i.e., "acceptable"), but is preferred among those configurations with acceptable metrics from the perspective of network resource scheduling. As another example, the network node can select a configuration identified as one of the N highest-priority configurations (e.g., from a set of M>N), but is preferred among the N highest-priority configurations from the perspective of network resource scheduling.

The exemplary method can also include the operations of block 940, where the network node can schedule the UE according to the selected configuration.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

FIG. 10 illustrates a high-level view of the 5G network architecture, consisting of a Next Generation RAN (NG-RAN) 1099 and a 5G Core (5GC) 1098. NG-RAN 1099 can include a set of gNodeB's (gNBs) connected to the 5GC via one or more NG interfaces, such as gNBs 1000, 1050 connected via interfaces 1002, 1052, respectively. In addition, the gNBs can be connected to each other via one or more Xn interfaces, such as Xn interface 1040 between gNBs 1000 and 1050. With respect to the NR interface to UEs, each of the gNBs can support frequency division duplexing (FDD), time division duplexing (TDD), or a combination thereof.

The NG RAN logical nodes shown in FIG. 10 (and described in TS 38.401 and TR 38.801) include a central (or centralized) unit (CU or gNB-CU) and one or more distributed (or decentralized) units (DU or gNB-DU). For example, gNB 1000 in FIG. 10 includes gNB-CU 1010 and gNB-DUs 1020 and 1030. CUs (e.g., gNB-CU 1010) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
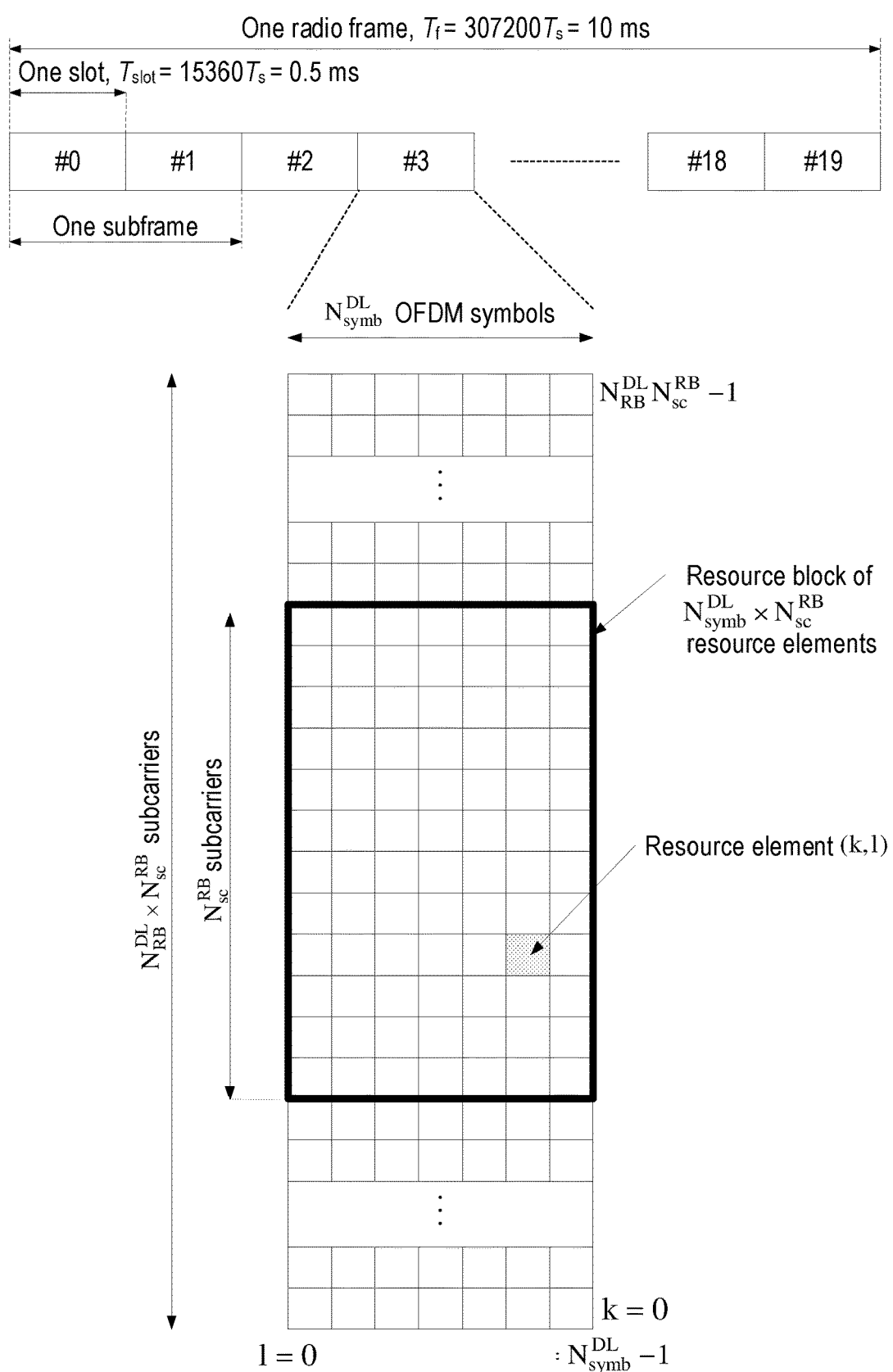
FIGS. 3A and 3B are block diagrams, respectively, of exemplary downlink and uplink LTE radio frame structures used for frequency division duplexing (FDD) operation.
Figure 3B:
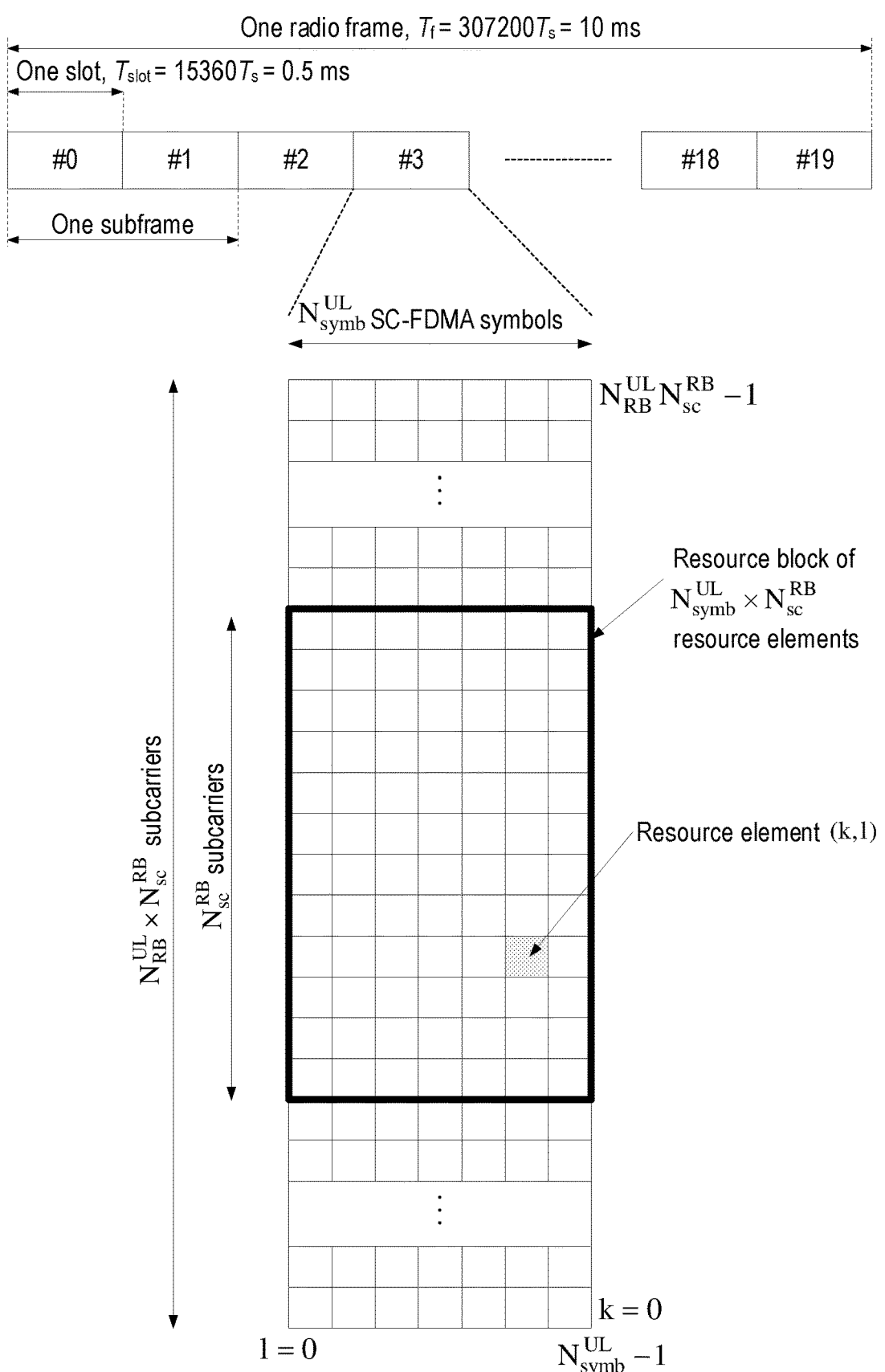

A gNB-CU connects to gNB-DUs over respective F1 logical interfaces, such as interfaces 1022 and 1032 shown in FIG. 3. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 11:
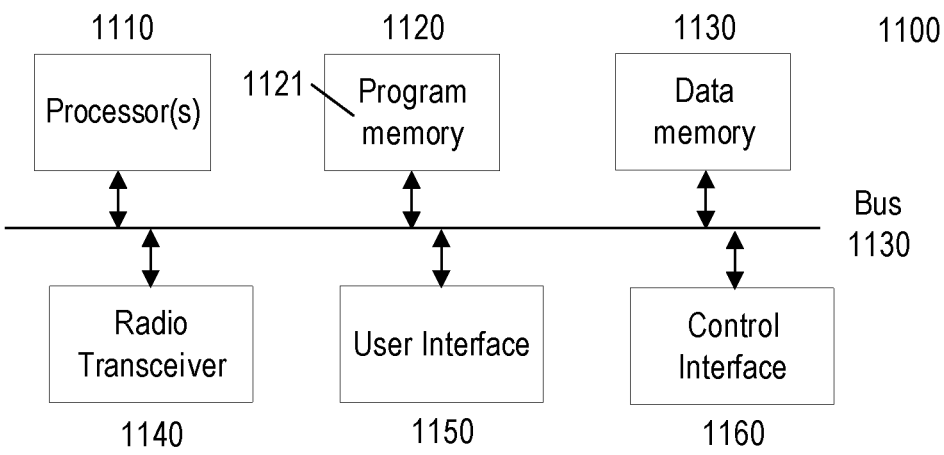
FIG. 11 is a block diagram of an exemplary wireless device or UE according to various exemplary embodiments.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods procedures described herein.

UE 1100 can include a processor 1110 (also referred to as "processing circuitry") that can be operably connected to a program memory 1120 and/or a data memory 1170 via a bus 1170 that can comprise parallel address and data buses, serial ports, or other methods and/or structures known to those of ordinary skill in the art. Program memory 1120 can store software code, programs, and/or instructions (collectively shown as computer program product 1161 in FIG. 11) that, when executed by processor 1110, can configure and/or facilitate UE 1100 to perform various operations, including operations described below. For example, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or control interface 1160. Program memory 1120 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1170 can include memory area for processor 1110 to store variables used in protocols, configuration, control, and other functions of UE 1100, including operations corresponding to, or comprising, any of the exemplary methods described herein. Moreover, program memory 1120 and/or data memory 1170 can include non-volatile memory (e.g., flash memory), volatile memory (e.g., static or dynamic RAM), or a combination thereof. Furthermore, data memory 1170 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1170 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1170.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods described herein or otherwise known to persons of ordinary skill.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, an RS-4115 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including any program code corresponding to and/or embodying any exemplary embodiments (e.g., of methods) described herein.

Figure 12:
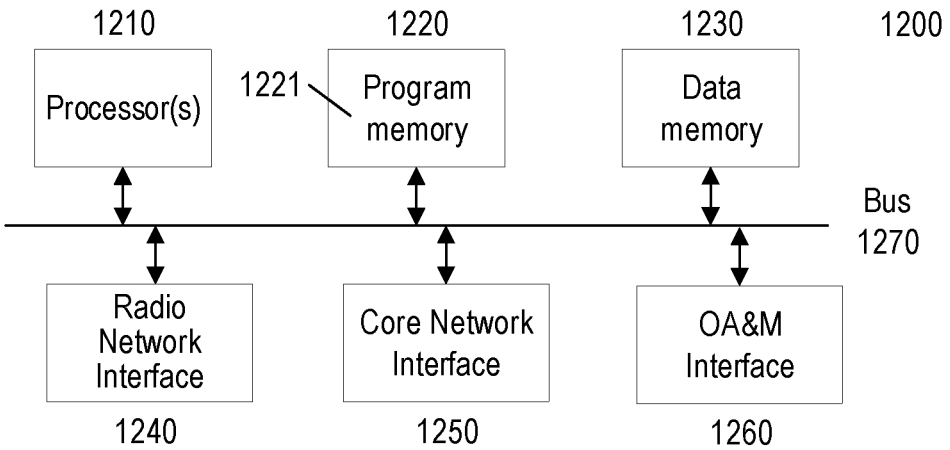
FIG. 12 is a block diagram of an exemplary network node according to various exemplary embodiments.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods described herein. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations. For example, execution of such stored instructions can configure network node 1200 to communicate with one or more other devices using protocols according to various embodiments of the present disclosure, including one or more exemplary methods described herein. Program memory 1220 can also comprise software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. By way of example and without limitation, core network interface 1250 can comprise the S1 interface and radio network interface 1240 can comprise the Uu interface, as standardized by 3GPP. Program memory 1220 can further comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
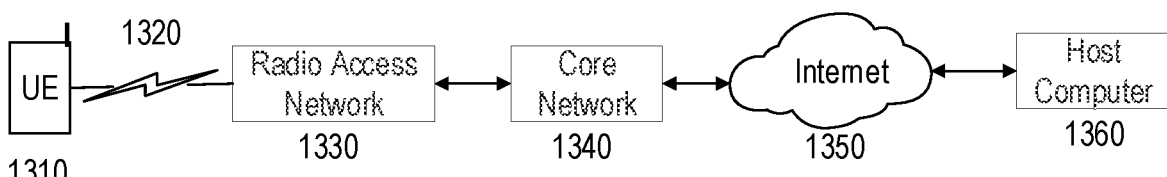
FIG. 13 is a block diagram of an exemplary network configured to provide over-the-top (OTT) data services between a host computer and a UE, according to various exemplary embodiments.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1250 described above. In some exemplary embodiments, RAN 1330 and core network 1340 can be configured and/or arranged as shown in other figures discussed above. For example, eNBs comprising an E-UTRAN 1330 can communicate with an EPC core network 1340 via an S1 interface, such as shown in FIG. 1. As another example, gNBs comprising a NR RAN 1330 can communicate with a 5GC core network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques for a network to offer a UE a set of candidate configurations and to request a UE preference among the set based on UE energy reduction goals, metrics, criteria, etc. Such techniques can facilitate network resource scheduling decisions that take into account UE preferences for energy reduction. Such techniques also allow UEs to reduce energy consumption while still receiving network-scheduled resources needed for UE transmission and/or reception, including for OTT services. When used in LTE or NR UEs (e.g., UE 1310) and eNBs or gNBs (e.g., gNBs comprising RAN 1330), exemplary embodiments described herein can provide various improvements, benefits, and/or advantages to OTT service providers and end-users, including more consistent data throughout and fewer delays without excessive UE energy consumption, service interruptions, or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

1. A method for reporting user equipment (UE) energy consumption information to a network node in a radio access network (RAN), the method comprising:
   acquiring a set of possible configurations;
   analyzing the acquired set of possible configurations with respect to energy consumption reduction;
   determining at least one of the following information with respect to the configurations of the set:
      for at least one configuration, an associated energy consumption metric; and
      a relative priority among the set with regards to energy consumption;
   reporting the determined information to the network node.

2. The method of embodiment 1, wherein acquiring the set of possible configurations comprise receiving the set from the network node.

3. The method of any of embodiments 1-2, further comprising indicating UE-supported configurations to the network node.

4. The method of embodiment 3, wherein the UE-supported configurations are indicated as one or more discrete levels of support for energy consumption reduction.

5. The method of any of embodiments 3-4, wherein the set of possible configurations are a subset of the indicated UE-supported configurations.

6. The method of any of embodiments 1-5, further comprising receiving one or more reporting requirements related to reporting the determined information.

7. The method of any of embodiments 1-6, wherein each configuration of the set includes settings for one or more parameters associated with operation of the UE and/or the network node: time-domain resources, frequency-domain resources, antenna- or spatial-domain resources, processing time or capability, discontinuous reception (DRX), physical downlink control channel (PDCCH) monitoring, wake-up settings, and go-to-sleep settings.

8. The method of any of embodiments 1-7, wherein the relative priority among the set is determined based on the energy consumption metric associated with each configuration.

9. The method of any of embodiment 1-7, wherein the energy consumption metrics are reported as a first metric for a particular configuration and differential metrics, relative to the first metric, for one or more remaining configurations of the set.

10. A method for scheduling a user equipment (UE) based on UE energy consumption information, the method comprising:
   sending the UE a set of possible configurations;
   receiving, from the UE, a report including one or more of the following:

for at least one configuration, an associated energy consumption metric; and
      a relative priority among the set with regards to energy consumption;
   selecting a particular configuration from the set for the UE; and
   scheduling the UE according to the selected configuration.

11. The method of embodiment 10, further comprising receiving, from the UE, an indication of UE-supported configurations.

12. The method of embodiment 11, wherein the UE-supported configurations are indicated as one or more discrete levels of support for energy consumption reduction.

13. The method of any of embodiments 11-12, wherein the set of possible configurations are selected from the indicated UE-supported configurations.

14. The method of any of embodiments 10-13, further comprising sending one or more reporting requirements to the UE.

15. The method of any of embodiments 10-14, wherein each configuration of the set includes settings for one or more parameters associated with operation of the UE and/or the network node: time-domain resources, frequency-domain resources, antenna- or spatial-domain resources, processing time or capability, discontinuous reception (DRX), physical downlink control channel (PDCCH) monitoring, wake-up settings, and go-to-sleep settings.

16. The method of any of embodiments 10-15, wherein selecting the particular configuration is selected based on the information comprising the report and at least one of the following: reports received from other UEs, current resource scheduling status, and expected upcoming resource scheduling requirements.

17. The method of any of embodiments 10-15, wherein the selected particular configuration is the configuration whose associated energy consumption metric is highest or lowest among the reported energy consumption metrics.

18. The method of any of embodiments 10-15, wherein selecting the particular configuration comprises:
   separating the set into first and second subsets, wherein all configurations of the first subset have an energy consumption metric or relative priority that is above a threshold, and all configurations of the second subset have an energy consumption metric or relative priority that is below the threshold; and
   selecting, from either the first or second subset, the configuration that is preferred for network resource scheduling.

19. The method of any of embodiment 10-18, wherein the received energy consumption metrics comprise a first metric for a particular configuration and differential metrics, relative to the first metric, for one or more remaining configurations of the set.

20. A user equipment (UE) configured to report energy consumption information to a network node in a radio access network (RAN), the UE comprising:
   communication circuitry configured to communicate with a network node; and
   processing circuitry operatively associated with the communication circuitry and configured to perform operations corresponding to the methods of any of exemplary embodiments 1-9.

21. A network node, in a radio access network (RAN), configured to schedule a user equipment (UE) based on UE energy consumption information, the network node comprising:
communication circuitry configured to communicate with the one or more UEs; and
processing circuitry operatively associated with the communication circuitry and configured to perform operations corresponding to the methods of any of exemplary embodiments 10-19.

22. A user equipment (UE) configured to report energy consumption information to a network node in a radio access network (RAN), the UE being arranged to perform operations corresponding to the methods of any of exemplary embodiments 1-9.

23. A network node, in a radio access network (RAN), configured to schedule a user equipment (UE) based on UE energy consumption information, the network node being arranged to perform operations corresponding to the methods of any of exemplary embodiments 10-19.

24. A non-transitory, computer-readable medium storing computer-executable instructions that, when executed by at least one processor of a user equipment (UE), configure the UE to perform operations corresponding to the methods of any of exemplary embodiments 1-9.

25. A non-transitory, computer-readable medium storing computer-executable instructions that, when executed by at least one processor of a network node, configure the network node to perform operations corresponding to the methods of any of exemplary embodiments 10-19.

The invention claimed is:

1. A method, performed by a network node, for scheduling user equipment (UEs) in a radio access network (RAN) based on UE energy consumption information, the method comprising:
sending, to a UE, a set of candidate configurations that are selected from a plurality of configurations supported by the UE;
receiving, from the UE, UE energy consumption information related to the set, including at least one of the following:
respective energy consumption metrics associated with one or more of the candidate configurations, and
a relative priority of the candidate configurations with regards to UE energy consumption reduction;
selecting one of the candidate configurations based on the UE energy consumption information, wherein the selected candidate configuration includes a physical downlink control channel (PDCCH) configuration and one of the following:
a physical downlink shared channel (PDSCH) configuration, or
a physical uplink shared channel (PUSCH) configuration; and
sending a scheduling message to the UE via a PDCCH in accordance with the PDCCH configuration of the selected candidate configuration, wherein the scheduling message indicates one of the following:
PDSCH resources in accordance with the PDSCH configuration of the selected candidate configuration, or
PUSCH resources in accordance with the PUSCH configuration of the selected candidate configuration.

2. The method of claim 1, wherein the set of candidate configurations includes a reference traffic type that is common to all candidate configurations in the set.

3. The method of claim 1, further comprising receiving, from the UE, an indication of the plurality of configurations supported by the UE.

4. The method of claim 3, wherein the plurality of configurations supported by the UE are indicated as one or more discrete levels of support for energy consumption reduction.

5. The method of claim 4, wherein:
each configuration supported by the UE includes a plurality of parameters or settings related to UE operation in the RAN; and
a discrete level of support for energy consumption reduction is indicated separately for each of the parameters or settings.

6. The method of claim 1, wherein each candidate configuration includes one or more of the following:
PDCCH configuration,
PDSCH configuration,
PUSCH configuration,
hybrid ARQ (HARQ) configuration,
minimum required processing times between UE operations,
discontinuous reception (DRX) configuration,
antenna or spatial configuration, and
frequency-domain configuration.

7. The method of claim 1, further comprising sending, to the UE, one or more reporting requirements related to the UE energy consumption information.

8. The method of claim 1, wherein selecting one of the candidate configurations is also based on at least one of the following:
UE energy consumption information received from other UEs,
current resource scheduling status, and
known or expected upcoming resource scheduling requirements.

9. The method of claim 1, wherein the selected candidate configuration is one of the following:
the candidate configuration whose associated energy consumption metric is best among the energy consumption metrics received from the UE;
the candidate configuration whose relative priority is highest.

10. The method of claim 1, wherein selecting one of the candidate configurations comprises:
separating the set of candidate configurations into first and second subsets based on a threshold, wherein:
all candidate configurations of the first subset have an energy consumption metric or a relative priority that is better than the threshold, and
all candidate configurations of the second subset have an energy consumption metric or a relative priority that is worse than the threshold; and
selecting, from either the first or second subset, a candidate configuration that is preferred for network resource scheduling.

11. The method of claim 1, wherein the respective energy consumption metrics are received as:
a first metric for a first candidate configuration of the set; and
differential metrics, relative to the first metric, for one or more other candidate configurations of the set.

12. A non-transitory, computer-readable medium storing computer-executable instructions that, when executed by processing circuitry of a network node of a radio access network (RAN), configure the network node to perform operations corresponding to the method of claim 1.

13. A network node configured to schedule user equipment (UEs) in a radio access network (RAN) based on UE energy consumption information, the network node comprising:

radio network interface circuitry configured to communicate with one or more UEs; and processing circuitry operatively coupled with the radio network interface circuitry, whereby the processing circuitry and the radio network interface circuitry are configured to:

send, to a UE, a set of candidate configurations that are selected from a plurality of configurations supported by the UE;

receive, from the UE, UE energy consumption information related to the set, including at least one of the following:

respective energy consumption metrics associated with one or more of the candidate configurations, and a relative priority of the candidate configurations with regards to UE energy consumption reduction;

select one of the candidate configurations based on the UE energy consumption information, wherein the selected candidate configuration includes a physical downlink control channel (PDCCH) configuration and one of the following:

a physical downlink shared channel (PDSCH) configuration, or a physical uplink shared channel (PUSCH) configuration; and send a scheduling message to the UE via a PDCCH in accordance with the PDCCH configuration of the selected candidate configuration, wherein the scheduling message indicates one of the following:

PDSCH resources in accordance with the PDSCH configuration of the selected candidate configuration, or PUSCH resources in accordance with the PUSCH configuration of the selected candidate configuration.

14. The network node of claim 13, wherein the set of candidate configurations includes a reference traffic type that is common to all candidate configurations in the set.

15. The network node of claim 13, wherein the processing circuitry and the radio network interface circuitry are further configured to receive, from the UE, an indication of the plurality of configurations supported by the UE, wherein the plurality of configurations supported by the UE are indicated as one or more discrete levels of support for energy consumption reduction.

16. The network node of claim 15, wherein:

each configuration supported by the UE includes a plurality of parameters or settings related to UE operation in the RAN; and a discrete level of support for energy consumption reduction is indicated separately for each of the parameters or settings.

17. The network node of claim 13, wherein each candidate configuration includes one or more of the following:

PDCCH configuration,

PDSCH configuration,

PUSCH configuration, hybrid ARQ (HARQ) configuration, minimum required processing times between UE operations, discontinuous reception (DRX) configuration, antenna or spatial configuration, and frequency-domain configuration.

18. The network node of claim 13, wherein the processing circuitry and the radio network interface circuitry are configured to select one of the candidate configurations also based on at least one of the following:

UE energy consumption information received from other UEs, current resource scheduling status, and known or expected upcoming resource scheduling requirements.

19. The network node of claim 13, wherein the selected candidate configuration is one of the following:

the candidate configuration whose associated energy consumption metric is best among the energy consumption metrics received from the UE;

the candidate configuration whose relative priority is highest.

20. The network node of claim 13, wherein the processing circuitry and the radio network interface circuitry are configured to select one of the candidate configurations based on:

separating the set of candidate configurations into first and second subsets based on a threshold, wherein:

all candidate configurations of the first subset have an energy consumption metric or a relative priority that is better than the threshold, and all candidate configurations of the second subset have an energy consumption metric or a relative priority that is worse than the threshold; and selecting, from either the first or second subset, a candidate configuration that is preferred for network resource scheduling.

* * * * *